(12) United States Patent
Ogata et al.

(10) Patent No.: US 11,335,943 B2
(45) Date of Patent: May 17, 2022

(54) SOLID STATE BATTERY VARIABLE PRESSURE OPTIMIZATION SYSTEM

(71) Applicant: TeraWatt Technology Inc., Santa Clara, CA (US)

(72) Inventors: Ken Ogata, Kanagawa (JP); Yang Yang, Kanagawa (JP); Hajime Hoshi, Kanagawa (JP); Masatsugu Nakano, Kanagawa (JP); Hiroshi Imoto, Kanagawa (JP)

(73) Assignee: TeraWatt Technology Inc., Santa Clara, CA (US)

( * ) Notice: Subject to any disclaimer, the term of this patent is extended or adjusted under 35 U.S.C. 154(b) by 262 days.

(21) Appl. No.: 16/529,188

(22) Filed: Aug. 1, 2019

(65) Prior Publication Data

US 2021/0036357 A1    Feb. 4, 2021

(51) Int. Cl.
*H01M 10/04* (2006.01)
*H01M 10/42* (2006.01)
*H01M 50/20* (2021.01)
*H01M 10/48* (2006.01)

(52) U.S. Cl.
CPC ... *H01M 10/0481* (2013.01); *H01M 10/4285* (2013.01); *H01M 10/48* (2013.01); *H01M 10/482* (2013.01); *H01M 50/20* (2021.01)

(58) Field of Classification Search
CPC .................. H01M 10/0481; H01M 10/48
See application file for complete search history.

(56) References Cited

FOREIGN PATENT DOCUMENTS

WO    2012/133711 A1    10/2012
WO    WO2012133711    *    10/2012

OTHER PUBLICATIONS

International Search Report and Written Opinion dated Oct. 30, 2020 in related application No. PCT/US2020/043898, all pgs.

\* cited by examiner

*Primary Examiner* — Ula C Ruddock
*Assistant Examiner* — Thomas H. Parsons
(74) *Attorney, Agent, or Firm* — Kilpatrick Townsend & Stockton LLP (57) ABSTRACT

Various variable planar pouch battery pressure optimization systems are presented. The system may include a first and second plate, between which a planar pouch battery cell is installed. Multiple pressure application components may be individually controlled to apply varying pressure to the first and second plate. Various pressure patterns may be tested in order to determine a pressure pattern that optimizes at least one electrical characteristic of the planar pouch battery cell.

18 Claims, 6 Drawing Sheets

FIG. 1

Prior Art

SOLID STATE BATTERY VARIABLE PRESSURE OPTIMIZATION SYSTEM

BACKGROUND

Some types of battery cells, such as some types of solid state battery (SSB) cells benefit from pressure being applied to the battery cell when in use (e.g., during charging and discharging cycles) to press layers of the battery cell against each other. Such pressure can help increase the amount of surface area contact between various layers of the SSB cell. The increase in surface area contact can help, for example, decrease internal resistance of the battery cell. For pouch-style battery cells, typically a planar battery cell is placed within a pouch. The pouch may then be compressed, such as using a compression jig in which the battery cell is intended to remain while the battery cell is in use.

Figure 1:
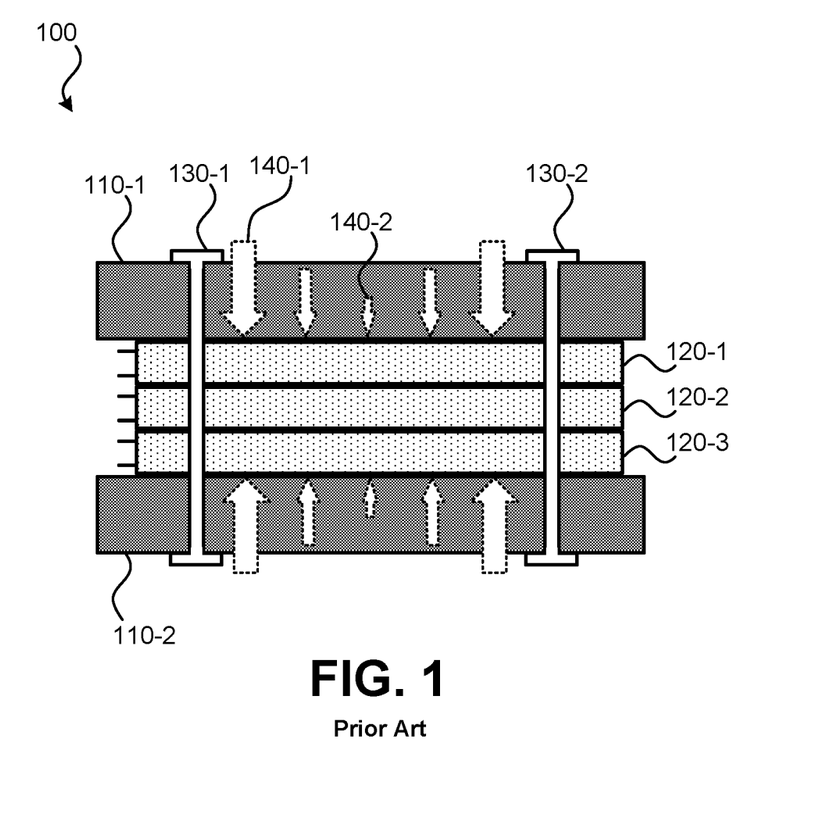
FIG. 1 illustrates an embodiment of a conventional planar pouch battery pressurization jig applying pressure to planar pouch battery cells.

FIG. 1 illustrates an embodiment 100 of a conventional planar pouch battery compression jig applying pressure to planar pouch battery cells. Planar pouch battery cells 120 (120-1, 120-2, 120-3) may be placed between two plates 110 (110-1, 110-2), which may be rigid or semi-rigid. Screws 130 (130-1, 130-2) may be used to move plates 110 toward each other, thereby compressing planar pouch battery cells 120.

Drawbacks to this conventional arrangement can include an uneven amount of pressure being applied across the surface of the planar battery cells. As represented by the size of arrows 140, the amount of pressure applied by plates 110 to planar pouch battery cells 120 may vary by location. For instance, some amount of flexing in plates 110 may cause the amount of pressure applied away from screws 130 (such as represented by arrow 140-2) to be less than the amount of pressure applied near screws 130 (such as represented by arrow 140-1). Additionally or alternatively, even if plates 110 were perfectly rigid, applying even pressure across the entire surface of planar pouch battery cells 120 may not result in optimal battery performance.

SUMMARY

Various embodiments are described related to a variable planar pouch battery pressure optimization system. In some embodiments, a variable planar pouch battery pressure optimization system is described. The system may comprise a first plate having a first side and a second side. The first side of the first plate may be opposite from the second side of the first plate. The system may comprise a second plate having a first side and a second side. The first side of the second plate may be opposite from the second side of the second plate. One or more planar pouch battery cells may be configured to be installed between the second side of the first plate and the second side of the second plate. The system may comprise a plurality of pressure application components. A first set of the plurality of pressure application components may press against the first side of the first plate and a second set of the plurality of pressure application components may press against the first side of the second plate. The system may comprise a pressure generator that individually may control an amount of pressure applied by each of the pressure application components of the plurality of pressure application components to the first side of the first plate and the first side of the second plate.

Embodiments of such a method may include one or more of the following features: a processing system in communication with the pressure generator that may provide an indication of an amount of pressure to be applied by each pressure application component of the plurality of pressure application components. The system may further comprise an electrical characteristic sensor that measures an electrical characteristic of the one or more planar pouch battery cells while pressure may be applied by the plurality of pressure application components. The electrical characteristic sensor may measure DC resistance. A measurement result datastore may be implemented using a non-transitory processor-readable medium. The processing system may receive electrical characteristic measurements from the electrical characteristic sensor of the one or more planar pouch battery cells and records corresponding data to the measurement result datastore as a plurality of entries. The corresponding data may indicate a measurement of the one or more characteristics and an indication of an amount of pressure applied by each pressure application component of the plurality of pressure application components. The processing system may be further configured to select an entry from the plurality of entries based on the measurement of the one or more characteristics. The processing system may be further configured to cause the pressure generator to apply a series of pressure patterns by altering an amount of pressure applied by each of the pressure application components of the plurality of pressure application components. The series of pressure patterns may be a series of random pressure patterns. The first set of the plurality of pressure application components may comprise five or more pressure application components and the second set of the plurality of pressure application components may comprise five or more pressure application components. Each pressure application component of the plurality of pressure application components may comprise a rigid bar. The pressure generator may use hydraulics to control the amount of pressure applied by each of the pressure application components of the plurality of pressure application components. The system may further comprise the one or more planar pouch battery cells. Each of the one or more planar pouch battery cells may be solid state battery cells.

In some embodiments, a method for optimizing pressure applied to a planar pouch battery cell is described. The method may comprise installing one or more planar pouch battery cells between a first plate and a second plate. The method may comprise applying a series of pressure patterns to the first plate and the second plate such that the pressure may be applied to the one or more planar pouch battery cells by the first plate and the second plate. Each pressure pattern of the series of pressure patterns may be applied by a plurality of pressure application components. An amount of pressure applied by each of the plurality of pressure application components may be individually controlled. A first set of the plurality of pressure application components may press against the first plate. A second set of the plurality of pressure application components may press against the second plate. The method may comprise determining the pressure pattern from the series of pressure patterns that may optimize performance.

Embodiments of such a method may include one or more of the following features: the method may further comprise, while applying each pressure pattern of the series of pressure patterns, measuring an electrical characteristic of the one or more planar pouch battery cells. The electrical characteristic may be a DC resistance. The method may further comprise, for each applied pressure pattern of the series of pressure patterns, recording the measured electrical characteristic mapped to an indication of the pressure pattern being applied by the plurality of pressure application components. Determining the pressure pattern from the series of pressure patterns that optimizes performance may comprise analyzing a plurality of recorded measured electrical characteristics to identify the measured electrical characteristic that may be optimized. The method may further comprise applying the determined pressure pattern to one or more additional planar pouch battery cells. The series of pressure patterns may be a series of random pressure patterns.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A variable battery cell pressure optimization system can be used to vary the amount of pressure applied in various positions on plates used to compress a planar pouch battery cell. The pressure patterns applied may be randomized or changes in a systematic process. While the pressure patterns are being varied, measurements of one or more electrical characteristics, such as resistance, of the planar pouch battery cell may be measured. Data may be stored that indicates the amount of pressure being applied at various locations on the plates along with an indication of the measured electrical characteristic. A pressure pattern that results in an optimal value of the electrical characteristic may be determined. This pressure pattern may then be tested on other planar pouch battery cells. If similar results are achieved, this pressure pattern may be implemented using a fixed compression jig or fixed pressurized jig that is intended to remain in a fixed position exerting the pressure pattern on the battery cell. For instance, such a fixed pressurized jig may be used to keep the pressure pattern on the battery cell while the battery cell is installed in an electric vehicle.

Figure 2:
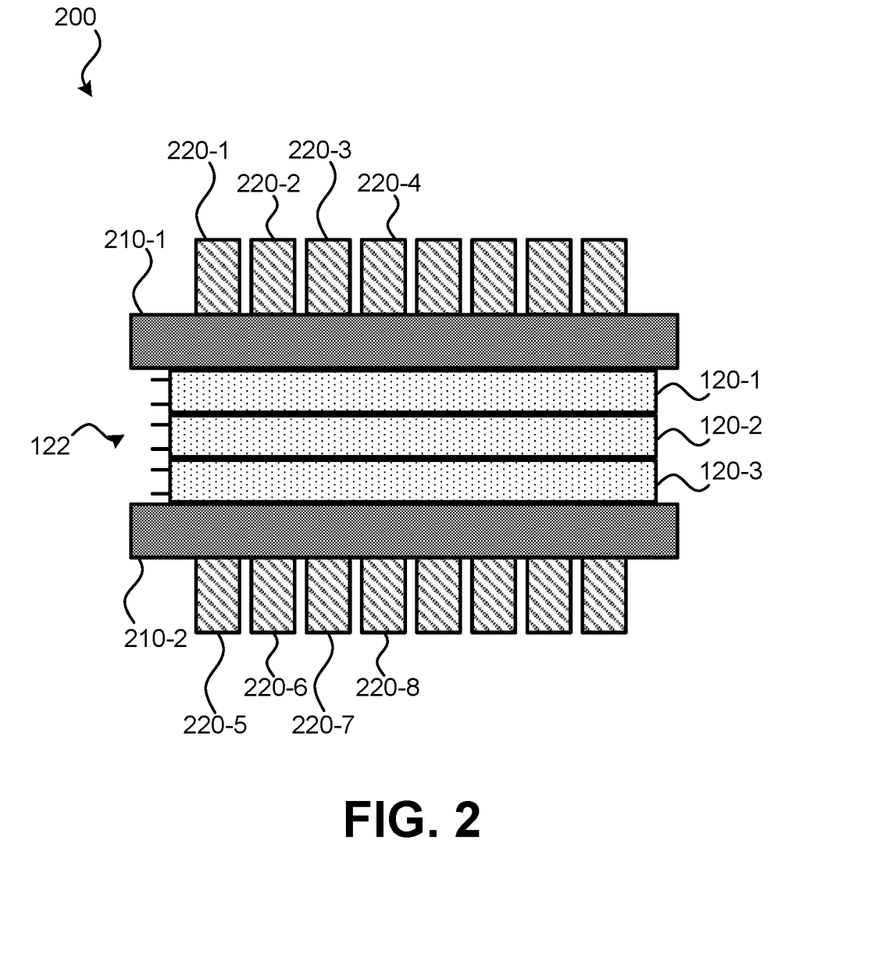
FIG. 2 illustrates a side view of an embodiment of a variable planar pouch battery pressure optimization system.

FIG. 2 illustrates a side view of an embodiment 200 of a variable planar pouch battery pressure optimization system. In embodiment 200, three planar pouch battery cells 120 (120-1, 120-2, 120-3), "battery cells" for short, are compressed between plates 210 (210-1, 210-2). While embodiment 200 illustrates three planar pouch battery cells 120, it should be understood that in other embodiments, one, two, or more than three battery cells 120 may be compressed by plates 210. Therefore, in some embodiments, such as embodiment 200, one or more battery cells may be compressed between or against other battery cells.

Plates 210 may be rigid or semi-rigid, such as made from metal or a plastic polymer. Each of plates 210 may have a first side that interfaces with pressure application components (PACs) 220. Each of plates 210 may have a second side, that is opposite the first side, that presses against battery cells 120. Therefore, pressure applied by PACs 220 to plates 210 is distributed and transferred to battery cells 120.

Each of PACs 220 may be individually controllable. That is, the amount of pressure applied using a first PAC (e.g., PAC 220-1) is completely independent of the amount of pressure applied using a second PAC (e.g., PAC 220-2). Therefore, an effectively unlimited combination of pressure patterns can be applied to plates 210 using PACs 220 by varying the amount of pressure applied by each PAC.

In some embodiments, PACs press on each plate. As illustrated, a first set of PACs, such as PACs 220-1, 220-2, 220-3, and 220-4, can exert pressure downward onto a top surface of plate 210-1. Plate 210-1, in turn, distributes and exerts downward pressure onto battery cells 120. A second set of PACs, such as PACs 220-5, 220-6, 220-7, and 220-8, can exert pressure upward onto a bottom surface of plate 210-2. Plate 210-2, in turn, distributes and exerts upward pressure onto battery cells 120. In other embodiments, PACs may only exert pressure onto one plate, such as plate 210-1. For example, plate 210-2 may be in a fixed position and the second set of PACs which includes PACs 220-5, 220-6, 220-7, and 220-8 may not be present.

PACs 220 may each be a metal bar. In some embodiments, PACs 220 may be cylindrical in shape. In other embodiments, PACs 220 may be in another shape. Rather than being metal bars, PACs 220 may be made of a hard polymer or some other rigid or semi-rigid material. Each PAC of PACs 220 may be actuated by a pressure generator. The pressure generator, not pictured, may generate pressure, such as using hydraulics, that is individually controlled for each PAC of PACs 220.

Visible in the side view of embodiment 200, eight PACs are present in a first set of PACs that provide pressure to plate 210-1 and eight PACs are present in a second set of PACs that provide pressure to plate 210-2. It should be understood that in other embodiments a fewer or greater number of PACs are present in each set. The number of PACs present may differ per set.

Figure 3:
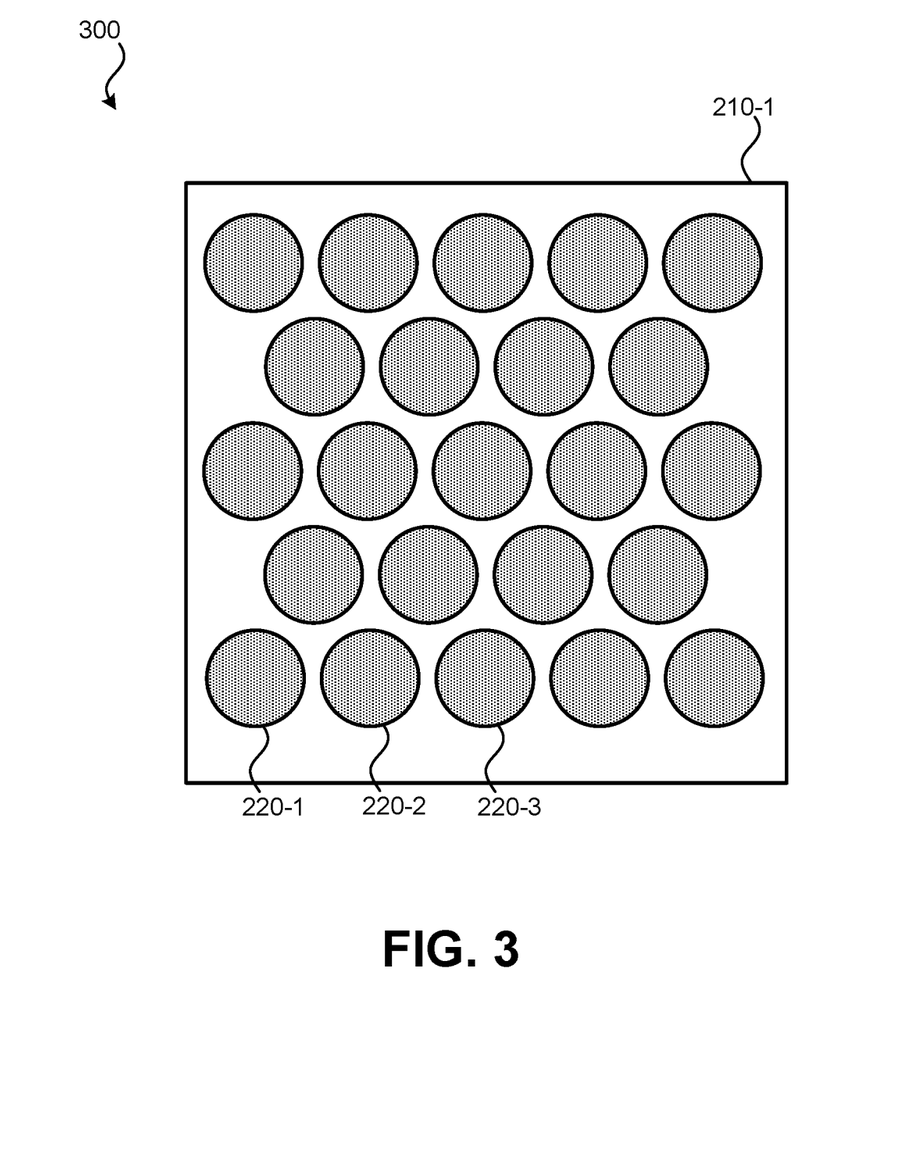
FIG. 3 illustrates a top view of an embodiment of a variable planar pouch battery pressure optimization system.

FIG. 3 illustrates a top view of an embodiment 300 of a variable planar pouch battery pressure optimization system. Embodiment 300 can represent a top view of embodiment 200. In Embodiment 300, it can be seen that PACs 220 can be arranged in a two-dimensional pattern. Each PAC of PACs 220 can apply a different pressure than each other PAC of PACs 220. Therefore, for example, the pressure applied used PAC 220-1 has no bearing on the amount of pressure applied by PAC 220-2. Such an arrangement allows for pressure to be varied in different locations on plate 210-1. In the illustrated embodiment, PACs 220 are arranged in offset rows. In other embodiments, PACs 220 may be arranged in a grid or in some other pattern. As can be seen in embodiment 300, space exists between PACs 220. In other embodiments, the amount of space may be greater or smaller. In some embodiments, PACs 220 may touch. If cuboid, PACs 220 may touch each other on four sides.

While embodiment 300 represents a top view, a bottom view could be essentially the same. In other embodiments, the bottom may use a different pattern and/or number of PACs.

Figure 4:
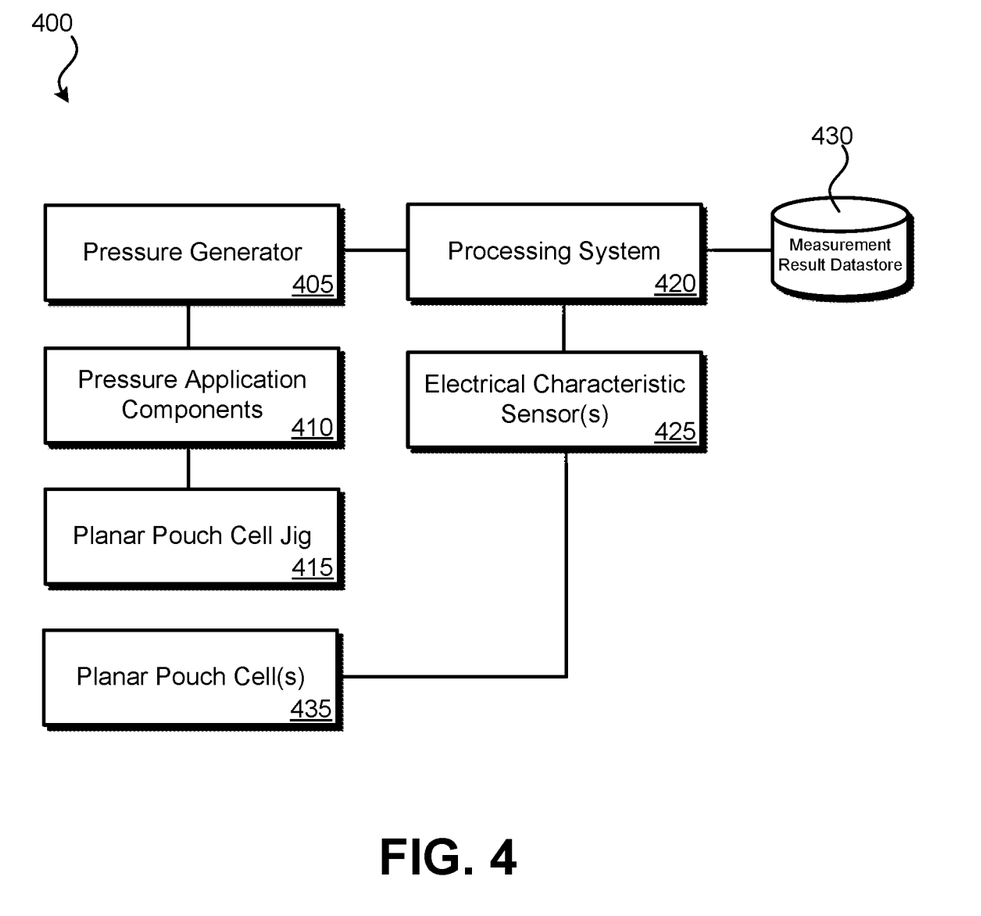
FIG. 4 illustrates a block diagram of an embodiment of a variable planar pouch battery pressure optimization system.

FIG. 4 illustrates a block diagram of an embodiment 400 of a variable planar pouch battery pressure optimization system. Embodiment 400 may incorporate the variable planar pouch battery pressure optimization system components illustrated in FIGS. 2 and 3. Embodiment 400 can include: pressure generator 405; PACs 410; planar pouch cell jig 415; processing system 420; one or more electrical characteristic sensors 425; measurement result datastore 430; and one or more planar pouch cells 435.

Pressure generator 405 may be a hydraulic, electric, or some other form of system that can individually actuate PACs. The amount of pressure applied to each PAC may be continuously variable or may be possible in stepped increments. Pressure generator 405 may be coupled to each PAC of PACs 410 individually. PACs 410 may be as detailed in relation to PACs 220 of FIGS. 2 and 3. Pressure generator 405 may be able to cause individual PACs of PACs 410 to apply between 0 N/cm2 and 10,000 N/cm2 of force to the outer surface of plates 210. Within that range, various pressure may be applied in various steps, such as with a resolution of 1 Newton. In other embodiments, the amount of pressure that can be applied is continuously variable.

PACs 410 may apply pressure to plates of planar pouch cell jig 415. Planar pouch cell jig 415 may include, at minimum, two plates, between which one or more planar pouch cells 435 are placed.

Processing system 420 may be in communication with pressure generator 405. Processing system 420 may be a separate computer system that communicates with pressure generator 405. Processing system 420 can include one or more processors. Processing system 420 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Processing system 420 may determine a pressure pattern that is to be applied by PACs 410. An indication of the pressure pattern may be communicated to pressure generator 405, which in turn causes the appropriate amount of pressure to be exerted by each of PACs 410 onto the plates of planar pouch cell jig 415. Processing system 420 may randomize the amount of pressure applied by each PAC of PACs 410. Examples of random pressure patterns are presented in relation to FIG. 5. Alternatively, predefined patterns of pressure may be applied, such as sinusoidal patterns or linear patterns of pressure.

Processing system 420 may receive measurements from one or more electrical characteristic sensors 425. Each of these electrical characteristic sensors 425 may measure an electrical characteristic of the one or more planar pouch cells 435 while the pressure pattern is being exerted onto the planar pouch cells by PACs 410 via planar pouch cell jig 415. The electrical characteristics sensors 425 can include a sensor to measure DC (direct current) resistance. Such a sensor may apply a DC voltage and measure the resulting current through the terminals of one or more of the battery cells. In some embodiments, the terminals of the planar pouch cell may be measured together, such by the being connected in series or parallel; in other embodiments, separate sensor measurements may be made of each battery cell. Additionally or alternatively, electrochemical impedance (EIS) may be measured for the battery cells. EIS may be measured in parallel, series, or individually for each battery cell. For EIS, a sinusoidal excitation voltage may be applied to the battery cell terminals and the current may be measured. From the measured current and the excitation voltage, the EIS can be determined.

Processing system 420 may receive electrical characteristic measurements from one or more electrical characteristic sensors 425. Processing system 420 may use measurement result datastore 430 to store indications of the measured electrical characteristics mapped to indications of pressure being applied by PACs 410. Since processing system 420 transmitted an indication of the amount of pressure each PAC of PACs 410 is to apply, processing system 420 already has data indicative of the amount of pressure being applied by each PAC. Alternatively, in some embodiments, sensors on individual PACs of PACs 410 may provide feedback of the actual measured pressure applied by each PAC. Measurement result datastore 430 may be stored using one or more non-transitory processor-readable storage mediums. Table 1 represents an example of how measurement result datastore 430 may be used to map sensor measurements with pressure.

TABLE 1

| Measurement Index | Measured DC Resistance (kΩ) | Measured EIS (kΩ) | PAC 1 (N) | PAC 2 (N) | PAC 3 (N) | PAC 4 (N) | PAC 5 (N) | PAC 6 (N) | PAC 7 (N) |
|---|---|---|---|---|---|---|---|---|---|
| 0 | 1024 | 1855 | 5734 | 239 | 1123 | 900 | 238 | 663 | 447 |
| 1 | 455 | 827 | 613 | 2712 | 2427 | 6515 | 1021 | 3221 | 5221 |
| 2 | 23 | 613 | 5745 | 3234 | 630 | 5323 | 8111 | 9400 | 512 |

In Table 1, only seven PACs are present. In real-world embodiments, it may be possible that dozens of PACs are present. Each PAC may be assigned an identifier, such as a number, such that the amount of pressure applied can be attributed to a specific PAC. Data may be stored in a different format or data storage arrangement in other embodiments.

Figure 5:
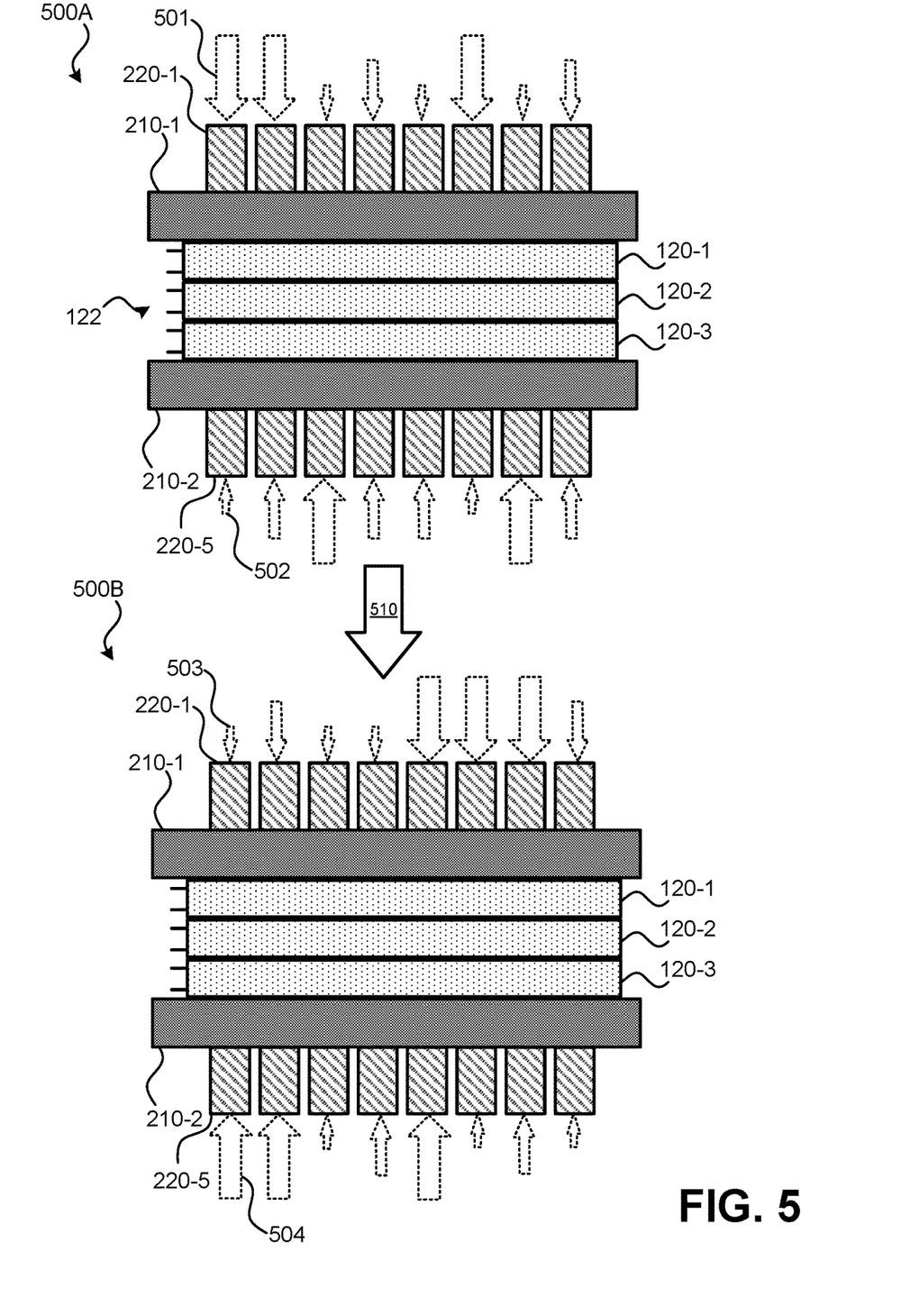
FIG. 5 illustrates a variable planar pouch battery pressure optimization system applying randomized pressures to planar pouch battery cells.

FIG. 5 illustrates a variable planar pouch battery pressure optimization system applying randomized pressures to planar pouch battery cells. In embodiments 500A and 500B, the size of dotted arrows represent the magnitude of pressure being applied to plates 210. As represented by the three arrow sizes, the amount of pressure applied by each PAC is either low, medium, or high. In other embodiments, the possible amounts of pressure applied may be greater, fewer, or continuously variable. It may also be possible for some PACs to not apply any pressure.

In embodiment 500A, a random pressure pattern is being applied to plates 210 by PACs 220. The pressure pattern can have been defined by the processing system that controls a pressure generator that individually actuates each of PACs 220. For example, a relatively large amount of pressure (represented by arrow 501) is applied by PAC 220-1 to plate 210-1 and a relatively small amount of pressure (represented by arrow 502) is applied by PAC 220-5 to plate 210-2. While the random pressure pattern of embodiment 500A is being applied, one or more electrical characteristic measurements may be made using terminals 122 of battery cells 120. The electrical characteristics of only a single battery cell may be measured or the electrical characteristics of multiple battery cells (in parallel, in series, or individually) may be measured.

After a period of time during which the pressure pattern is applied, a transition (represented by an arrow 510) may occur that transforms embodiment 500A to embodiment 500B. Embodiment 500B can involve a different random pressure pattern being applied to battery cells 120. Again here, the pressure pattern can have been defined by the processing system that controls a pressure generator that individually actuates each of PACs 220. For example, a relatively large amount of pressure (represented by arrow 504) is applied by PAC 220-5 to plate 210-2 and a relatively small amount of pressure (represented by arrow 503) is applied by PAC 220-1 to plate 210-1. While the random pressure pattern of embodiment 500B is being applied, one or more additional electrical characteristic measurements may be made using terminals 122 of battery cells 120.

The process of applying a random pressure pattern may repeat through tens, hundreds, or thousands of random pressure patterns to determine a pattern that provides a best or optimal electrical characteristic or set of characteristics.

In FIG. 5, the pressure patterns selected by the processing system for application to the battery cells are randomized. In other embodiments, predefined or calculated pressure patterns may not be random. For example, sinusoidal pressure patterns, linear pressure patterns, and/or pressure patterns determined based on sensor measurement feedback may be used instead. For instance, as an electrical characteristic measurement increases or decreases in a desired direction, similar pressure changes may be implement in an attempt to optimize the electrical characteristic measurements. As an example, if decreasing the pressure applied using a particular PAC causes a decrease in DC resistance, the pressure applied to this particular PAC may continue to be decreased in an attempt to further decrease the DC resistance.

Figure 6:
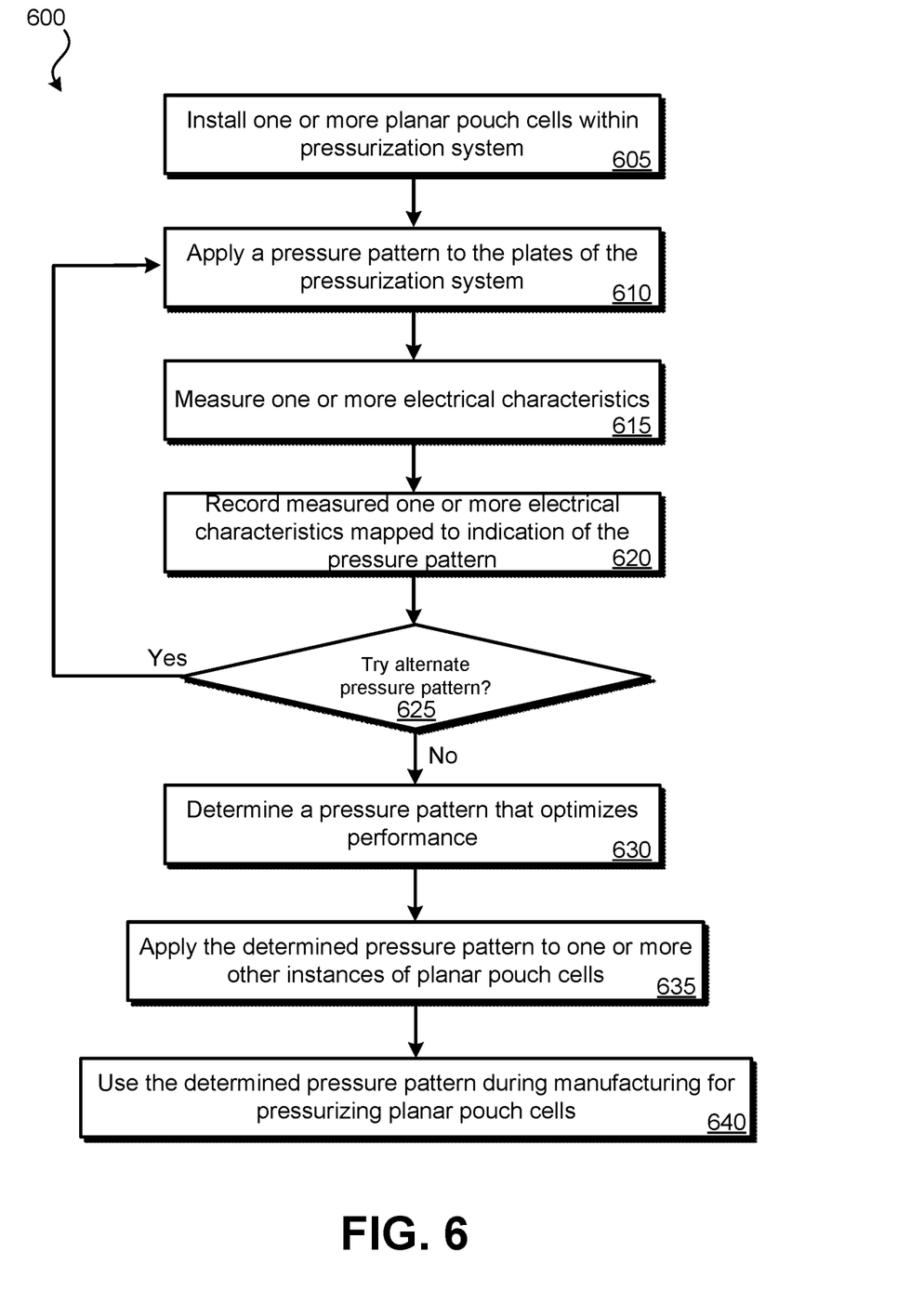
FIG. 6 illustrates an embodiment of a method for applying an optimized pressure to a planar pouch cell.

Various methods may be performed using the systems and embodiments detailed in relation to FIGS. 2-5. FIG. 6 illustrates an embodiment of a method 600 for applying an optimized pressure to a planar pouch cell. Method 600 may be performed using a variable planar pouch battery pressure optimization system as detailed in relation to FIGS. 2-5. At block 605, one or more planar pouch battery cells may be installed within the variable planar pouch battery pressure optimization system. If multiple battery cells are installed, the battery cells may be layered on top of each other, wherein battery cells in the center are pressured by adjacent battery cells.

At block 610, a pressure pattern may be applied to the plates of the planar pouch cell jig. The pressure pattern may be randomized or predefined in nature. The pressure pattern may involve PACs of the system applying varying amounts of pressure to the plates. Therefore, while a first PAC is applying a first amount of pressure, a second amount of pressure applied by a second PAC may not be dependent on the first amount of pressure.

At block 615, while the pressure pattern of block 610 is being applied, one or more electrical characteristics of the one or more battery cells may be measured. For instance, DC resistance and/or EIS may be measured via the electrical terminals of the one or more battery cells. At block 620, the one or more measurements of block 615 may be recorded.

The one or more measurements may be recorded to a non-transitory processor readable medium, such as a measurement result datastore. The measurement result datastore may also store indications of the amount of pressure applied by each PAC to the plates of the jig. For example, measurement result data store may be similar to the example of Table 1.

At block 625, it may be determined whether an alternate pressure pattern is to be applied to the one or more battery cells. For example, tens, hundreds, or thousands of various pressure patterns may be applied to the battery cells in an attempt to optimize the one or more electrical characteristics. If the decision of block 625 is yes, method 600 may proceed to block 610 and apply a different pressure pattern. If randomized pressure patterns are used, the processing system may determine a new randomized pressure pattern and apply at block 610. If predefined pressure patterns are used, the next pressure pattern may be retrieved from storage and may be applied at block 610. If the pressure patterns are based on feedback, a next pressure pattern may be determined based on the one or more electrical characteristics recorded at block 620. If the determination of block 625 is no, method 600 may proceed to block 630.

At block 630, by analyzing the previously recorded measurements, a pressure pattern may be determined that optimizes performance of the one or more battery cells. To perform block 630, the previously recorded measurements may be analyzed for an optimized electrical characteristic. This may include for example, finding a minimum DC resistance, a minimum EIS, or both. In some embodiments, a compromise may need to be struck between multiple measured electrical characteristics. Other factors in selecting a pressure pattern may need to be taken into account, such as manufacturability and tolerances. Once an optimized electrical characteristic is determined, the pressures applied by the PACs that are stored in association with the electrical characteristic may be accessed. These pressures may again be applied to the battery cells to optimize the electrical characteristic.

To test whether the optimized electrical characteristic will also be realized with other battery cells, the battery cells installed at block 605 may be removed and a new set of one or more planar pouch cells may be installed within the jig. The pressure pattern associated with the optimized electrical characteristic may be applied to the new set of one or more of cells. A determination may be made as to whether this new set of battery cells also realizes the optimized electrical characteristic. Such a test may be repeated on multiple sets of one or more battery cells to determine the repeatability of realizing the optimized electrical characteristic in various sets of battery cells.

Assuming that the optimized electrical characteristic was realized in multiple sets of battery cells, the determined pressure pattern may be used as part of the manufacturing process when planar pouch cells are installed as part of manufactured devices. For instance, planar pouch cells may be installed within a mechanical jig that permanently applies pressure to the planar pouch cells. The pressure pattern determined to produce the optimized electrical characteristic may be implemented using each mechanical jig within each instance of the manufactured device. For example, mechanical jigs that apply the determined pressure pattern may be used in manufactured electrical vehicles.

In other embodiments, for each one or more pouch cells, an optimal pressure pattern may be determined for those particular one or more pouch cells. Therefore, every set of one or more pouch cells that are to be installed as part of a manufactured device may have its own optimal customized pressure pattern determined and permanently applied using a jig within the manufactured device.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known processes, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A variable planar pouch battery pressure optimization system comprising:
   a first plate having a first side and a second side, wherein the first side of the first plate is opposite from the second side of the first plate;
   a second plate having a first side and a second side, wherein:
      the first side of the second plate is opposite from the second side of the second plate; and
      one or more planar pouch battery cells are configured to be installed between the second side of the first plate and the second side of the second plate;
   a plurality of pressure application components, wherein a first set of the plurality of pressure application components press against the first side of the first plate and a second set of the plurality of pressure application components press against the first side of the second plate;
   a pressure generator that individually controls an amount of pressure applied by each of the pressure application components of the plurality of pressure application components to the first side of the first plate and the first side of the second plate;
   a processing system in communication with the pressure generator that provides an indication of an amount of pressure to be applied by each pressure application component of the plurality of pressure application components; and
   an electrical characteristic sensor that measures an electrical characteristic of the one or more planar pouch battery cells while pressure is being applied by the plurality of pressure application components.

2. The variable planar pouch battery pressure optimization system of claim 1, wherein the electrical characteristic sensor measures DC resistance.

3. The variable planar pouch battery pressure optimization system of claim 1, further comprising:
   a measurement result datastore implemented using a non-transitory processor-readable medium, wherein the processing system receives electrical characteristic measurements from the electrical characteristic sensor of the one or more planar pouch battery cells and records corresponding data to the measurement result datastore as a plurality of entries.

4. The variable planar pouch battery pressure optimization system of claim 3, wherein the corresponding data indicates: a measurement of the one or more characteristics; and an indication of an amount of pressure applied by each pressure application component of the plurality of pressure application components.

5. The variable planar pouch battery pressure optimization system of claim 4, wherein the processing system is further configured to select an entry from the plurality of entries based on the measurement of the one or more characteristics.

6. The variable planar pouch battery pressure optimization system of claim 4, wherein the processing system is further configured to cause the pressure generator to apply a series of pressure patterns by altering an amount of pressure applied by each of the pressure application components of the plurality of pressure application components.

7. The variable planar pouch battery pressure optimization system of claim 6, wherein the series of pressure patterns is a series of random pressure patterns.

8. The variable planar pouch battery pressure optimization system of claim 1, wherein the first set of the plurality of pressure application components comprises five or more pressure application components and the second set of the plurality of pressure application components comprises five or more pressure application components.

9. The variable planar pouch battery pressure optimization system of claim 1, wherein each pressure application component of the plurality of pressure application components comprises a rigid bar.

10. The variable planar pouch battery pressure optimization system of claim 9, wherein the pressure generator uses hydraulics to control the amount of pressure applied by each of the pressure application components of the plurality of pressure application components.

11. The variable planar pouch battery pressure optimization system of claim 1, further comprising:
   the one or more planar pouch battery cells, wherein each of the one or more planar pouch battery cells are solid state battery cells.

12. A method for optimizing pressure applied to a planar pouch battery cell, the method comprising:

installing one or more planar pouch battery cells between a first plate and a second plate;

applying a series of pressure patterns to the first plate and the second plate such that the pressure is applied to the one or more planar pouch battery cells by the first plate and the second plate, wherein:

each pressure pattern of the series of pressure patterns is applied by a plurality of pressure application components;

an amount of pressure applied by each of the plurality of pressure application components is individually controlled;

a first set of the plurality of pressure application components press against the first plate; and     a second set of the plurality of pressure application components press against the second plate; and determining the pressure pattern from the series of pressure patterns that optimizes performance.

13. The method for optimizing pressure applied to the planar pouch battery cell of claim 12, further comprising:

while applying each pressure pattern of the series of pressure patterns, measure an electrical characteristic of the one or more planar pouch battery cells.

14. The method for optimizing pressure applied to the planar pouch battery cell of claim 13, wherein the electrical characteristic is a DC resistance.

15. The method for optimizing pressure applied to the planar pouch battery cell of claim 13, further comprising:

for each applied pressure pattern of the series of pressure patterns, recording the measured electrical characteristic mapped to an indication of the pressure pattern being applied by the plurality of pressure application components.

16. The method for optimizing pressure applied to the planar pouch battery cell of claim 15, wherein determining the pressure pattern from the series of pressure patterns that optimizes performance comprises analyzing a plurality of recorded measured electrical characteristics to identify the measured electrical characteristic that is optimized.

17. The method for optimizing pressure applied to the planar pouch battery cell of claim 16, further comprising:

applying the determined pressure pattern to one or more additional planar pouch battery cells.

18. The method for optimizing pressure applied to the planar pouch battery cell of claim 12, wherein the series of pressure patterns is a series of random pressure patterns.

\* \* \* \* \*